US008139056B2

(12) United States Patent
Lee et al.

(10) Patent No.: US 8,139,056 B2

(45) Date of Patent: Mar. 20, 2012

(54) PLURAL POWER GENERATING UNITS FOR USE IN A LIQUID CRYSTAL DISPLAY AND CONTROL THEREOF

(75) Inventors: Cheol Ho Lee, Cheonan-si (KR); Hyeon Seok Bae, Asan-si (KR); Sang Chul Lee, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 836 days.

(21) Appl. No.: 12/193,151

(22) Filed: Aug. 18, 2008

(65) Prior Publication Data

US 2009/0073154 A1 Mar. 19, 2009

(30) Foreign Application Priority Data

Aug. 29, 2007 (KR) ........................ 10-2007-0087250

(51) Int. Cl.
*G06F 3/038* (2006.01)
*G09G 5/00* (2006.01)

(52) U.S. Cl. ........................................ 345/211; 345/103

(58) Field of Classification Search .......... 345/211–213, 345/87, 103

See application file for complete search history.

(56) References Cited

U.S. PATENT DOCUMENTS

| | | | | |
|---|---|---|---|---|
| 2001/0043181 | A1* | 11/2001 | Park | 345/87 |
| 2007/0024555 | A1* | 2/2007 | Park et al. | 345/87 |
| 2007/0040795 | A1* | 2/2007 | Lee et al. | 345/100 |
| 2007/0182683 | A1* | 8/2007 | Chin et al. | 345/88 |
| 2008/0309608 | A1* | 12/2008 | Shen et al. | 345/101 |

* cited by examiner

*Primary Examiner* — Chanh Nguyen
*Assistant Examiner* — Kwang-Su Yang
(74) *Attorney, Agent, or Firm* — Innovation Counsel LLP

(57) ABSTRACT

A power generating module is provided in an LCD where the power generating module includes a first driving voltage generator, a second driving voltage generator and an output deviation controller. The first driving voltage generator generates and outputs a first set of LCD driving voltages including a first liquid crystal driving voltage and a first gate-on-voltage. The second driving voltage generator generates and outputs a similar second set of LCD driving voltages. The output deviation controller controls the first and second driving voltage generators using one or more feedback signals each corresponding to a potential difference between counterpart output voltages of the first driving voltage and the second driving voltage to reduce output deviations between those counterpart output voltages.

16 Claims, 4 Drawing Sheets

PLURAL POWER GENERATING UNITS FOR USE IN A LIQUID CRYSTAL DISPLAY AND CONTROL THEREOF

CROSS-REFERENCE TO RELATED APPLICATION

This application claims priority to Korean Patent Application No. 10-2007-0087250 filed in the Korean Intellectual Property Office on Aug. 29, 2007 and all the benefits accruing therefrom under 35 U.S.C. §119, the contents of which are incorporated by reference in their entirety.

BACKGROUND

The present disclosure relates to a power generating module and a liquid crystal display ("LCD"), and more particularly, to a power generating module that can provide a plurality of driving voltages, each having small output voltage variation, to a plurality of drivers for driving an LCD panel, and an LCD having the same.

An LCD is a device that controls transmittance of light incident from a light source using optical anisotropy of liquid crystal molecules and the polarization characteristic of a polarizer to display an image. A large screen LCD can be lightweight, have a slim profile and have high resolution. Also, since an LCD has low power consumption, application fields thereof rapidly extend recently.

An LCD is divided into a display area for displaying an image and a peripheral area disposed outside the display area to apply an electrical signal to the display area. A driver for driving a plurality of pixels formed in the display area can be disposed in the peripheral area. For example, a gate driver for applying a scanning signal, i.e., a gate signal to each pixel, and a data driver for applying an image signal, i.e., a data signal to each pixel can be formed in the peripheral area. The gate signal applied by the gate driver is delivered to the respective pixels through a gate line, the respective pixels being connected along the corresponding line. Generally, as the size of an LCD panel increases, a signal line becomes longer and the line resistance increases. Therefore, output of a gate driver is required to be increased for smooth operation. However, increasing the output of the gate driver is limited since the gate driver is typically manufactured in the form of an integrated circuit (IC). Therefore, in a case of a medium to a large-sized LCD panel, gate drivers are provided in both sides of the display area. In this configuration, one gate line is driven by a pair of gate drivers, so that insufficient output is supplemented. In this case, a pair of driving voltage generators is required to provide driving voltages to the pair of gate drivers, from which various problems are generated due to output deviation of driving voltages provided from both driving voltage generators. For example, in a case where levels of the liquid crystal driving voltages AVDD output from the pair of driving voltage generators are not substantially identical, gray scale voltages generated on the basis of the level of the liquid crystal driving voltage AVDD become different. Thus, the display gray scales on left and right screen areas may also be different from each other. Also, since levels of gate-on-voltages Von output from the respective driving voltage generators become different, the gate drive at each pixel also becomes different, so that display brightness on the left and right screen areas may not be identical.

SUMMARY

The present disclosure provides a power module that can reduce output deviation of driving powers output from a plurality of power units.

The present disclosure also provides an LCD that can remove a screen display defects such as brightness abnormality and gray scale abnormality on both sides of the screen, the screen display defect being caused by voltage level deviation of driving powers respectively provided to a plurality of drivers.

In accordance with an exemplary embodiment, a power generating module includes: a first driving voltage generator for generating and outputting a first driving voltage including a first liquid crystal (LC) driving voltage and a first gate-on-voltage; a second driving voltage generator for generating and outputting a second driving voltage including a second LC driving voltage and a second gate-on-voltage; and an output deviation controller for controlling the first driving voltage generator and the second driving voltage generator using a feedback signal corresponding to a potential difference between the first driving voltage and the second driving voltage to reduce output deviation between the first driving voltage and the second driving voltage.

The output deviation controller may include: a first output deviation controller for controlling output deviation between the first LC driving voltage and the second LC driving voltage; and a second output deviation controller for controlling output deviation between the first gate-on-voltage and the second gate-on-voltage.

The first output deviation controller may include a comparator for generating a feedback signal corresponding to a potential difference between a division voltage of the first LC driving voltage and a division voltage of the second LC driving voltage. Here, the comparator may provide a feedback signal generated on the basis of the division voltage of the second LC driving voltage to the first driving voltage generator, and provide a feedback signal generated on the basis of the division voltage of the first LC driving voltage to the second driving voltage generator. Also, the first output deviation controller may further include a resistor for controlling an output level of the comparator.

The second output deviation controller may include a comparator for generating a feedback signal corresponding to a potential difference between a division voltage of the first gate-on-voltage, and a division voltage of the second gate-on-voltage. Here, the comparator may provide a feedback signal generated on the basis of the division voltage of the second gate-on-voltage to the first driving voltage generator, and provide a feedback signal generated on the basis of the division voltage of the first gate-on-voltage to the second driving voltage generator. Also, the second output deviation controller may further include a resistor for controlling an output level of the comparator.

The power generating module may further include: a DC-DC converter for generating the first LC driving voltage and the second LC driving voltage; and a charge pumping circuit for generating the first gate-on-voltage and the second gate-on-voltage. Here, the charge pumping circuit may include: a reference terminal to which a reference voltage is applied; an input terminal to which a pulse signal is input; and an output terminal through which a voltage level of the reference voltage raised by charge pumping is output.

In accordance with another exemplary embodiment, a liquid crystal display (LCD) includes: an LCD panel including a plurality of gate lines and a plurality of data lines, the gate lines and the data lines crossing each other; a first gate driver and a second gate driver for driving the plurality of gate lines; a first data driver and a second data driver for driving the plurality of data lines; a first driving voltage generator for providing a first driving voltage to at least one of the first gate driver and the first data driver; a second driving voltage generator for providing a second driving voltage to at least one of the second gate driver and the second data driver; and an output deviation controller for controlling the first driving voltage generator and the second driving voltage generator using a feedback signal corresponding to a potential difference between the first driving voltage and the second driving voltage to reduce output deviation between the first driving voltage and the second driving voltage.

The first and second gate drivers may be connected to both sides of the plurality of gate lines. Also, the first and second data drivers may be connected to the plurality of data lines on a left area of the LCD panel, and to the plurality of data lines on a right area of the LCD panel, respectively.

The first driving voltage may include a first LC driving voltage and a first gate-on-voltage, and the second driving voltage may include a second LC driving voltage and a second gate-on-voltage, and the output deviation controller may include a first output deviation controller for controlling output deviation between the first LC driving voltage and the second LC driving voltage, and a second output deviation controller for controlling output deviation between the first gate-on-voltage and the second gate-on-voltage.

The first output deviation controller may include a comparator for generating a feedback signal corresponding to a potential difference between a division voltage of the first LC driving voltage and a division voltage of the second LC driving voltage.

The second output deviation controller may include a comparator for generating a feedback signal corresponding to a potential difference between a division voltage of the first gate-on-voltage, and a division voltage of the second gate-on-voltage.

BRIEF DESCRIPTION OF THE DRAWINGS

Exemplary embodiments will be understood in more detail from the following description taken in conjunction with the accompanying drawings, in which.

DETAILED DESCRIPTION OF EMBODIMENTS

Figure 1:
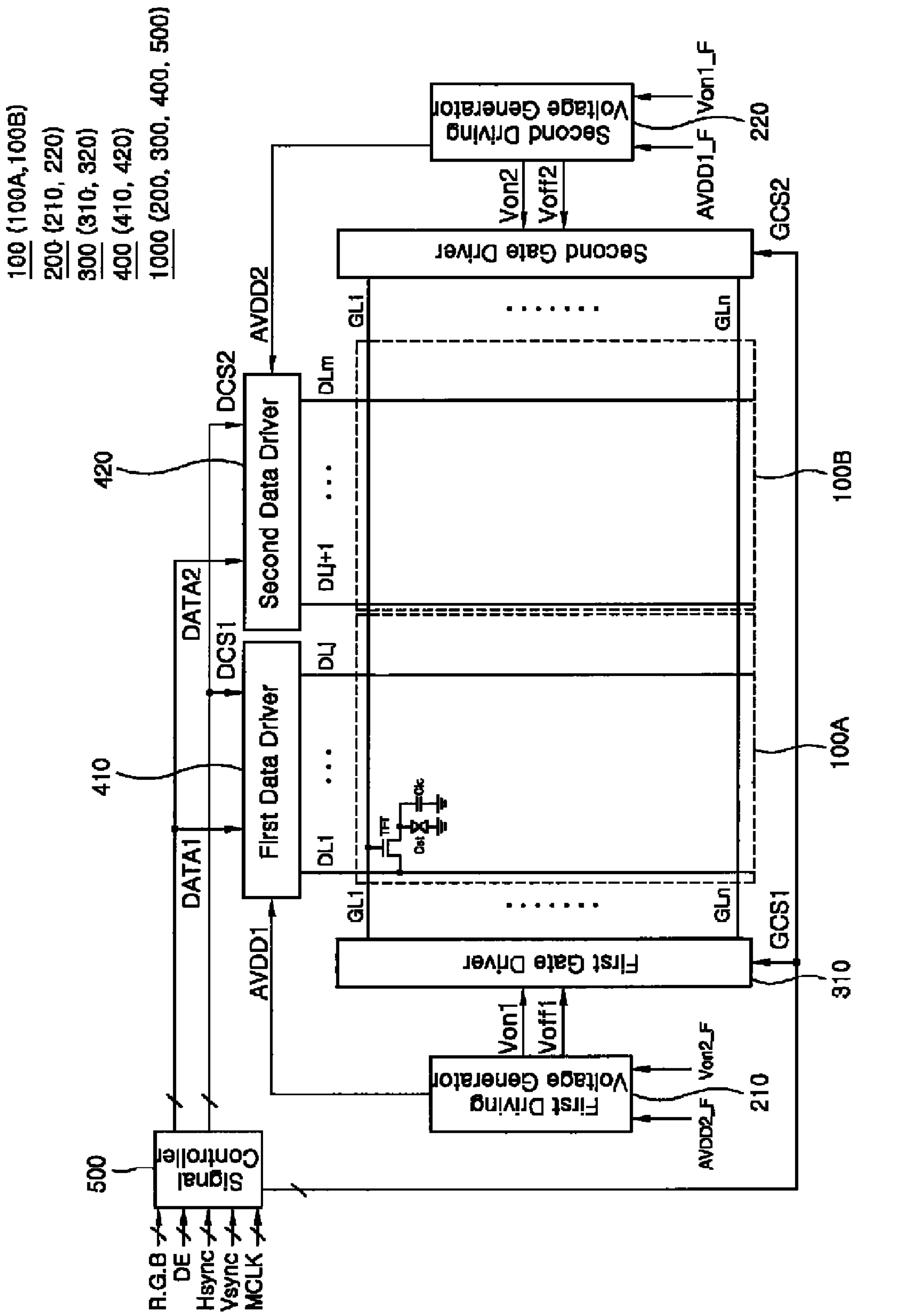
FIG. 1 is a block diagram of an LCD in accordance with an exemplary embodiment of the present invention.

Hereinafter, specific embodiments will be described in detail with reference to the accompanying drawings.

However, the present invention is not limited to the embodiments disclosed below but may be implemented into different forms. These embodiments are provided only for illustrative purposes and for full understanding of the scope of the present invention by those skilled in the art. Like reference numerals refer to like elements throughout the specification.

FIG. 1 is a block diagram of an LCD according to an exemplary embodiment of the present invention.

Referring to FIG. 1, the LCD includes an LCD panel 100 including a plurality of pixels arranged in a matrix form, and a liquid crystal driving circuit 1000 which includes first and second driving voltage generators 210 and 220 respectively, first and second gate driver circuits 310 and 320 respectively, first and second data driver circuits 410 and 420 respectively and signal controller 500 for controlling the operations of the pixels.

The LCD panel 100 includes a plurality of gate lines GL1 through GLn, a plurality of data lines DL1 through DLm, and a plurality of unit pixels. The plurality of gate lines GL1 through GLn extend in one direction, and the plurality of data lines DL1 through DLm extend in a direction intersecting the plurality of gate lines GL1 through GLn. At least one end of each of the gate lines GL1 through GLn is connected to a gate driver circuits 310 and 320. At least one end of each of the data lines DL1 through DLm is connected to the first or second data driver circuits 410 and 420.

The unit pixels are formed in areas where the gate lines GL1 through GLn and data lines DL1 through DLm intersect each other. Referring to FIG. 1, the unit pixel includes a thin film transistor (TFT), a liquid crystal capacitor Clc, and may further include a storage capacitor Cst. The liquid crystal capacitor Clc includes a lower pixel electrode, an upper common electrode, and liquid crystal interposed between the pixel electrode and the common electrode. Also, though not shown, a color filter is disposed on an upper side of the liquid crystal capacitor Clc. The pixel electrode and the common electrode can be divided into a plurality of domains. Of course, the LCD panel 100 is not limited to the above description, but various modifications can be made. For example, a plurality of pixels can be formed within a unit pixel area. Also, the unit pixel area can have a horizontal length longer or shorter than a vertical length. Also, the unit pixel area can be modified to various shapes other than an approximate quadrangular shape.

The liquid crystal driving circuit 1000 to provide signals for driving the LCD panel 100 is provided outside the above-described LCD panel 100. The liquid crystal driving circuit 1000 includes a gate driver 200, a data driver 300, a driving voltage generator 400, and a signal controller 500 for controlling them.

The signal controller 500 receives input image signals and input control signals from an external graphic controller (not shown). The input image signals include pixel data R, G, and B, and the input control signals include a vertical synchronization signal Vsync, a horizontal synchronization signal Hsync, a main clock MCLK, and a data enable signal DE. Also, the signal controller 500 processes the pixel data R, G, and B to be suitable for an operation condition of the LCD panel 100. By doing so, the pixel data R, G, and B are rearranged (DATA1/DATA2) according to pixel arrangement of the LCD panel 100. Also, the signal controller 500 generates gate control signals GCS1/GCS2, and transmits the gate control signals GCS1/GCS2 to the gate driver 300. The signal controller 500 generates data control signals DCS1/DCS2, and transmits the data control signals DCS1/DCS2 to the data driver 400. The gate control signals GCS1/GCS2 include a vertical synchronization start signal STV instructing output start of a gate-on-voltage Von, a gate clock signal CPV, and an output enable signal OE. The data control signals DCS1/DCS2 include a horizontal synchronization start signal STH informing transmission start of pixel data DATA1/DATA2, a load signal ROAD instructing supply of a data voltage to a corresponding data line, an inversion signal RVS inverting the polarity of a gray scale voltage with respect to a common voltage, and a data clock signal DCLK.

A driving voltage generator 200, which includes first and second driving voltage generators 210 and 220 respectively, generates various driving voltages required for driving the LCD using external power Vin input from an external power source unit (not shown). That is, the driving voltage generator 200 generates a gate-on-voltage Von, a gate-off-voltage Voff, and a liquid crystal driving voltage AVDD. Also, the driving voltage generator 200 provides the gate-on-voltage Von and the gate-off-voltage Voff to the gate driver 300, and provides the liquid crystal driving voltage AVDD to the data driver 400. Here, the liquid crystal driving voltage AVDD is an analog voltage, and is used as a reference voltage for generating a gray scale voltage for driving liquid crystal.

First and second gate drivers 310 and 320 are connected to the plurality of gate lines GL1 through GLn, and sequentially provides the gate-on-voltage of the driving voltage generator 200 to the plurality of gate lines GL1 through GLn in response to a control signal of the signal controller 500. By doing so, the operation of the TFT can be controlled.

The data driver 400 is connected to the plurality of data lines DL1 through DLm and generates a gray scale voltage using the control signal of the signal controller 500 and the liquid crystal driving voltage AVDD of the driving voltage generator 200. Also, the data driver 400 applies the corresponding gray scale voltage to each of the data lines DL1 through DLm. That is, the data driver 400 converts input digital pixel data DATA1 and DATA2 into analog data signal on the basis of the liquid crystal driving voltage AVDD, and outputs the analog data signal. The data driver 400 according to the exemplary embodiment may generate a pair of gray scale voltages having different polarities, that is, a positive (+) gray scale voltage and a negative (−) gray scale voltage. Then the data driver 400 applies the data signal of which polarity is inverted according to an inversion signal RVS of the signal controller 500 to each of the data lines D1 through Dm using the gray scale voltages. That is, a pair of data signals having positive and negative polarities with respect to a common voltage applied to a common electrode may be alternately applied for each dot, each line, each column, or each frame to prevent pixel deterioration.

The signal controller 500, the driving voltage generator 200, the gate driver 300, and the data driver 400 are manufactured in an integrated circuit (IC) form and provided on a printed circuit board ("PCB"). The PCB is electrically connected to the LCD panel 100 through a flexible printed circuit (FPC) board (not shown). The gate driver 300 and the data driver 400 can be provided on a lower substrate of the LCD panel 100. Alternatively, the gate driver 300 can be directly formed in a form of a stage on the lower substrate of the LCD panel 100. That is, the gate driver 300 can be formed together when the TFT is formed on the lower substrate.

In an LCD panel in accordance with the exemplary embodiment of the present invention, a display area may be divided into a plurality of areas to be driven. For this purpose, the gate drivers 300 and data drivers 400 can be provided in plurality, respectively. That is, the gate driver 300 includes a first gate driver 310 connected to one end of each of the gate lines GL1 through GLn, and a second gate driver 320 connected to the other end of each of the gate lines GL1 through GLn. The data driver 400 includes a first data driver 410 connected to each of the data lines DL1 through DLj for driving a left area 100A of the LCD panel 100, and a second data driver 420 connected to each of the data lines DLj+1 through DLm for driving a right area 100B of the LCD panel 100. As described above, the display area of the LCD panel 100 is divided into a plurality of areas 100A and 100B to be driven, and the gate drivers 310 and 320 are disposed on opposite ends of the gate line GL, respectively, so that the LCD panel 100 can be suitably used for a medium to large-sized product requiring high power because of RC delay. The RC delay is a signal delay as much as a time constant (γ=RC), where R is a resistance of a signal line and C is a parasitic capacitance generated by an area of the signal line, and the time constant is determined by product of the resistance R and the parasitic capacitance C. Generally, the RC delay increases as the size of the LCD panel increases. Accordingly, a signal output is insufficient and thus generates various limitations such as signal delay and display quality reduction. Therefore, as the size of the LCD panel increases, an output should be increased in a conventional LCD. However, in the exemplary embodiment, the LCD panel 100 is divided to be driven using the plurality of gate drivers 300 and the data drivers 400, whereby the insufficient output limitation can be improved.

As described above, the LCD panel 100 is driven using the plurality of gate drivers 310 and 320, and the plurality of data drivers 410 and 420. Accordingly, a plurality of driving voltage generators 200 providing various driving power to these drivers may be provided. That is, the driving voltage generator 200 includes a first driving voltage generator 210 for providing various powers to the first gate driver 310 and the first data driver 410, and a second driving voltage generator 220 for providing various powers to the second gate driver 320 and the second data driver 420. Hereinafter, the constructions and operations of the first and second driving voltage generators 210 and 220 is described in more detail.

Figure 2:
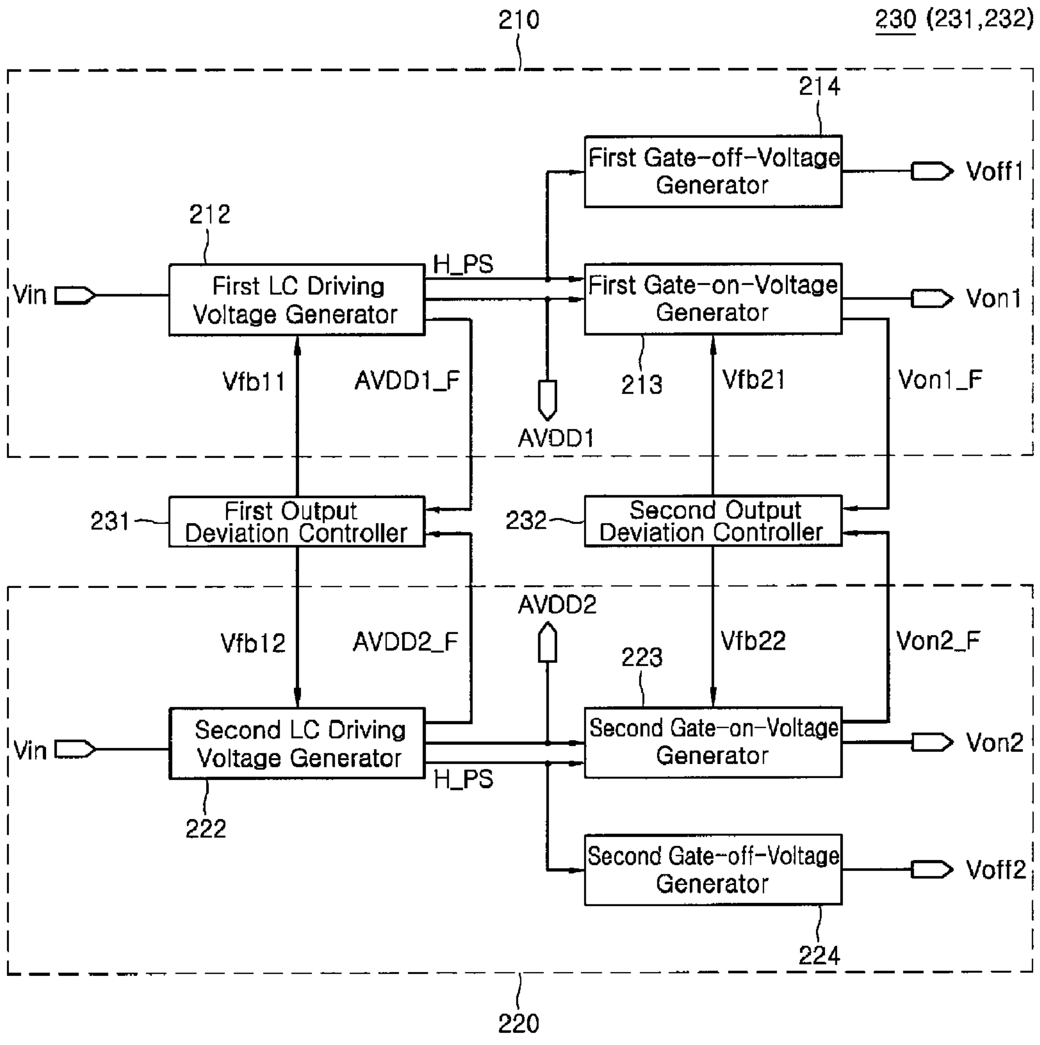
FIG. 2 is a block diagram of the first and second driving voltage generators of FIG. 1.
Figure 3:
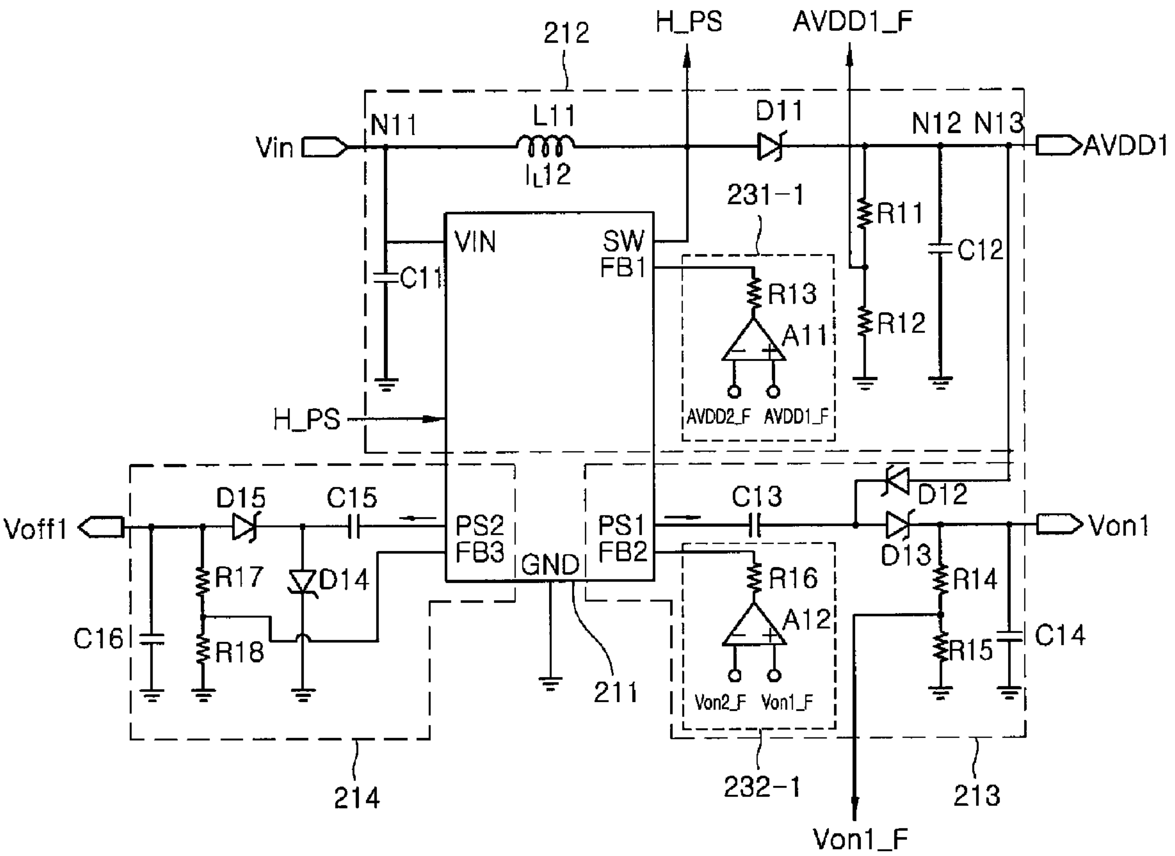
FIG. 3 is a circuit diagram of the first driving voltage generator of FIG. 2.
Figure 4:
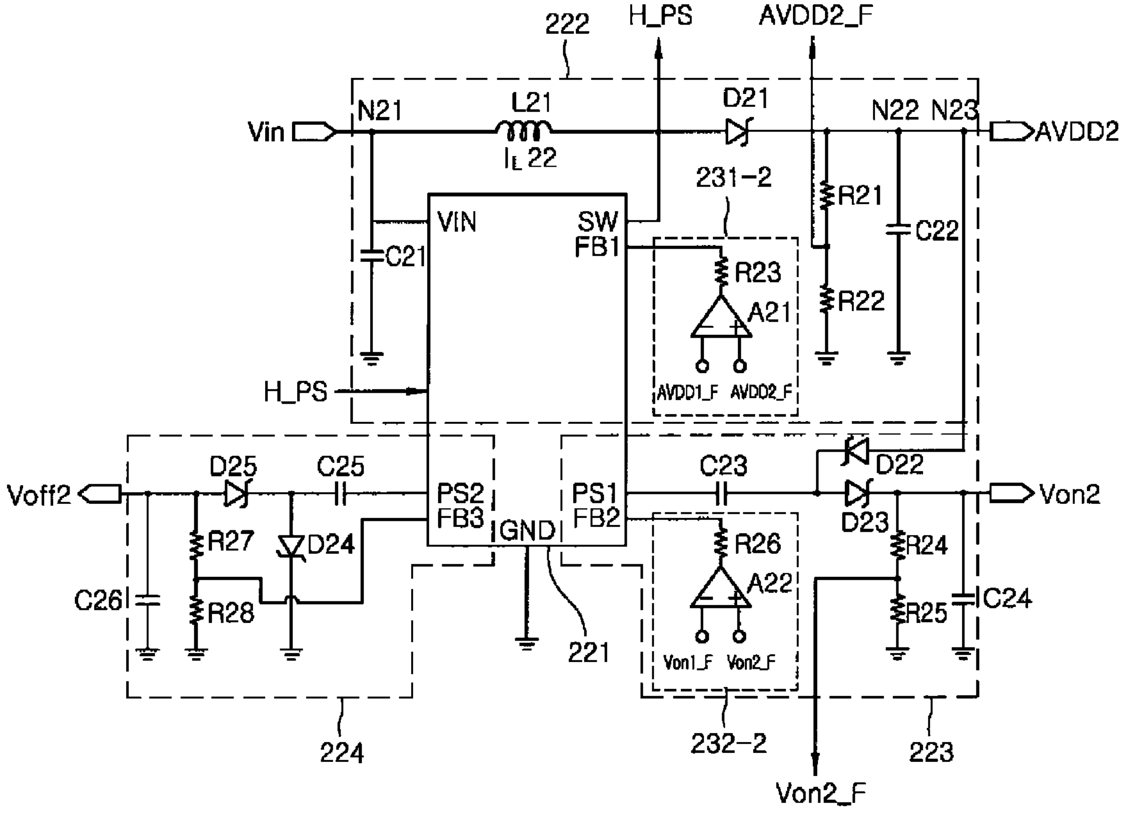
FIG. 4 is a circuit diagram of the second driving voltage generator of FIG. 2.

FIG. 2 is a block diagram of the first driving voltage generator 210 and the second driving voltage generator 220 of FIG. 1, FIG. 3 is a circuit diagram of the first driving voltage generator 210 of FIG. 2, and FIG. 4 is a circuit diagram of the second driving voltage generator 220 of FIG. 2.

Referring to FIG. 2, the driving voltage generator 200 includes the first driving voltage generator 210, the second driving voltage generator 220, and first and second output voltage deviation controllers 231 and 232 for controlling output voltage deviation of these driving voltage generators.

The first driving voltage generator 210 includes a first liquid crystal driving voltage generator 212 for generating a first liquid crystal driving voltage AVDD1, a first gate-on-voltage generator 213 for generating a first gate-on-voltage Von1, and a first gate-off-voltage generator 214 for generating a first gate-off-voltage Voff1. Also, the second driving voltage generator 220 includes a second liquid crystal driving voltage generator 222 for generating a second liquid crystal driving voltage AVDD2, a second gate-on-voltage generator 223 for generating a second gate-on-voltage Von2, and a second gate-off-voltage generator 224 for generating a second gate-off-voltage Voff2.

The output deviation controller 230 includes a first output deviation controller 231 for controlling output deviation of the first and second liquid crystal driving voltage generators 212 and 222, and a second output deviation controller 232 for controlling output deviation of the first and second gate-on-voltage generators 213 and 223. The first output deviation controller 231 provides first feedback signals corresponding to a potential difference between division voltages AVDD1_F and AVDD2_F, which are produced by resistive voltage dividers in first and second LC driving voltage generators 212 and 222 respectively, of the first and second liquid crystal driving voltages AVDD1 and AVDD2 respectively received from the first and second liquid crystal driving voltage generators 212 and 222 to the first and second liquid crystal driving voltage generators 212 and 222, respectively, to reduce output deviation between the first and second liquid crystal driving voltages AVDD1 and AVDD2. The second output deviation controller 232 provides first and second feedback signals Vfb21 and Vfb22 corresponding to a potential difference between division voltages Von1_F and Von2_F of the first and second gate-on-voltages received from the first and second gate-on-voltage generators 213 and 223 to the first and second gate-on-voltage generators 213 and 223, respectively, to reduce output deviation between the first and second gate-on-voltages Von1 and Von2.

Referring to FIGS. 3 and 4, the liquid crystal driving voltage generators 210/220 include a DC-DC converter 212/222. The driving voltage generator 210/220 switches an inductor L11/L12 to which an input voltage Vin has been applied, generates a high frequency pulse H_PS, and rectifies the high frequency pulse H_PS to generate the liquid crystal driving voltage AVDD1/AVDD2. The gate-on-voltage generator 213/223 includes a first charge pump circuit for generating a gate-on-voltage Von1/Von2 using the liquid crystal driving voltage AVDD1/AVDD2 and a first pulse signal. The gate-off-voltage generator 214/224 includes a second charge pump circuit for generating a gate-off-voltage Voff1/Voff2 using a grounded power source and a second pulse signal. The first output deviation controller 231-1/231-2 includes: a first comparator A11/A21 for outputting a voltage difference between the first and second driving voltages AVDD1 and AVDD2; and a resistor R13/R23 for controlling the output level of the first comparator A11/A21. Here, switching of the inductor L11/L12 is performed by a pulse width modulation (PWM) module 211/221. PWM modules, suitable for use in practicing the present invention are available from Texax Instruments (12500 TI Boulevard, Dallas, Tex. 75243, USA), and may be, for example, product number TPS65160. The PWM module 211/221 generates the first pulse signal and provides the first pulse signal to the gate-on-voltage generator 213/223. The PWM module 211/221 also generates the second pulse signal and provides the second pulse signal to the gate-off-voltage generator 214/224.

The DC-DC converter 212/222 includes: the inductor L11/L12 connected to an input terminal thereof; a first diode D11/D21 having an anode connected to the inductor L11/L12 and having a cathode connected to an output terminal N12/N22 thereof; first and second division resistors R11/R21 and R12/R22 connected in series between a connection node and a ground, the connection node being disposed between the first diode D11/D21 and the output terminal; a first capacitor C11/C21 connected between the input terminal and the ground; and a second capacitor C12/C22 connected between the output terminal and the ground. A switch terminal SW of the PWM module 211/221 is connected to a connection node between the inductor L11/L12 and the first diode D11/D21. And a first feedback terminal FB1 of the PWM module 211/221 is connected to a connection node between the first resistor R11/R21 and the second resistor R12/R22.

The PWM module 211/221 is manufactured as one IC including a power terminal VIN, the first feedback terminal FB1, the switch terminal SW, the ground GND, a switching device (not shown) connected between the switch terminal SW and the ground GND, and a pulse modulator (not shown) for controlling the switching device. The PWM module 211/221 is driven by an input voltage Vin supplied through the power terminal VIN. The PWM module 211/221 modulates the pulse width of a switching signal which is oscillated inside the PWM module 211, and controls the switching device according to a modulated switching signal. The duty ratio of the modulated switching signal is changed according to a voltage level of a signal input to the first feedback terminal FB1. The PWM module 211/221 includes a first pulse output terminal PSI for outputting a first pulse signal, a second feedback terminal FB2 for controlling a voltage level of the first pulse signal, a second pulse output terminal PS2 for outputting a second pulse signal, and a third feedback terminal FB3 for controlling a voltage level of the second pulse signal. In the present exemplary embodiment, the liquid crystal driving voltage AVDD1/AVDD2, a gate-on-voltage Von1/Von2 and a gate-off-voltage Voff1/Voff2 may be generated using a high voltage pulse H_PS generated by the inductor L11/L12 according to switching of the PWM module 211/221. For this purpose, the PWM module 211/221 may receive the high voltage pulse H_PS again and generate the first and second pulse signals using the high voltage pulse H_PS. Of course, the first and second pulse signals can be generated regardless of the high voltage pulse H_PS.

When the switching device is turned on by a switching signal modulated inside the PWM module 211/221, a current path is formed between the input voltage Vin and the ground. Therefore, a current $I_L$11/$I_L$21) flowing through the inductor L11/L21 increases in proportion to time. As the input voltage Vin flows through the inductor L11/L21, corresponding energy is stored in the inductor L11/L21. Subsequently, when the switching device is turned off by a switching signal modulated inside the PWM module 211/221, the current path between the input voltage Vin and the ground is blocked, and the current flowing through the inductor L11/L21 is cut off. Accordingly, the high voltage pulse H_PS is generated by reverse electromotive force (EMF) of high energy in the inductor L11/L21. The high voltage pulse H_PS is rectified and output while it flows through the first diode D11/D21 and the second capacitor C12/C22. Therefore, the input voltage Vin is raised to a predetermined voltage and output as the liquid crystal driving voltage AVDD1/AVDD2.

The first and second liquid crystal driving voltages AVDD1 and AVDD2 generated through the above process are provided to the first and second resistors R11/R21 and R12/R22 and divided. The divided voltages AVDD1_F and AVDD2_F are input to the first comparator A11/A21 of the first output deviation controller 231-1/231-2. Referring to FIG. 3, in the first output deviation controller 231-1 for controlling the output level of the first liquid crystal driving voltage generator 221, the divided voltage AVDD2_F of the second liquid crystal driving voltage is input to an inverting terminal (−) of the first comparator A11, and the divided voltage AVDD1_F of the first liquid crystal driving voltage is input to a non-inverting terminal (+) of the first comparator A11. Therefore, the first comparator A11 outputs the first feedback signal Vfb11 corresponding to a difference (AVDD2_F−AVDD1_F) between two divided voltages with respect to the divided voltages of the second liquid crystal driving voltage AVDD2_F. Also, referring to FIG. 4, in the first output deviation controller 231-2 for controlling the output level of the second liquid crystal driving voltage generator 222, the divided voltage AVDD1_F of the first liquid crystal driving voltage is input to an inverting terminal (−) of the first comparator A21, and the divided voltage AVDD2_F of the second liquid driving voltage is input to a non-inverting terminal (+) of the first comparator A21. Therefore, the first comparator A21 outputs the first feedback signal Vfb12 corresponding to a difference (AVDD1_F−AVDD2_F) between two divided voltages with respect to the divided voltages of the first liquid crystal driving voltage AVDD1_F. The first feedback signals Vfb11 and Vfb12 are provided to the PWM modules 211 and 221, respectively. And accordingly, a duty ratio of the switching signal is adjusted again inside the PWM modules 211 and 221, so that the voltage levels of the first and second liquid crystal driving voltages AVDD1 and AVDD2 converge to an intermediate level to reduce output deviation between the first and second liquid crystal driving voltages AVDD1 and AVDD2. Therefore, the first and second liquid crystal driving voltages AVDD1 and AVDD2 have almost the same voltage level.

The first charge pumping circuit 213/223 includes a reference terminal to which a reference voltage is applied, an input terminal to which a first pulse signal is applied, and an output terminal through which a voltage level of the reference voltage raised by charge pumping is output. Here, a liquid crystal driving voltage AVDD1/AVDD2 output from the liquid crystal driving voltage generator 212/222 is used as the reference voltage, and a first pulse signal output from the first pulse output terminal PS1 of the PWM module 211/221 is used as the first pulse signal.

As described above, the first pulse signal may be generated using a high voltage pulse H_PS generated by the inductor L11/L12 according to switching of the PWM module 211/221. Since the voltage of an output terminal should be greater than that of a reference terminal in the first charge pumping circuit 213/223, the first charge pumping circuit 213/223 may include at least one diode having an anode connected towards a reference terminal and a cathode connected towards an output terminal. For example, the first charge pumping circuit 213/223 may include a second diode D12/D22 and a third diode D13/D23 connected in series, and a third capacitor C13/C23 connected to a node between the second diode D12/D22 and the third diode D13/D23. Here, the second diode D12/D22 and the third diode D13/D23 may be zener diodes.

During a time period when the voltage level of a first pulse, i.e., a high voltage pulse signal H_PS is smaller than the voltage level of liquid crystal driving voltage AVDD1/AVDD2, a reverse voltage is applied to the third diode D13/D23 and a forward voltage is applied to the second diode D12/D22. Accordingly, the third diode D13/D23 does not conduct, and the second diode D12/D22 conducts, so that the third capacitor C13/C23/) is charged with positive (+) charges corresponding to a potential difference between the liquid crystal driving voltage AVDD1/AVDD2 and the high voltage pulse signal H_PS. Subsequently, during a time period when the voltage level of the high voltage pulse signal H_PS is greater than the voltage level of liquid crystal driving voltage AVDD1/AVDD2, a reverse voltage is applied to the second diode D12/D22 and a forward voltage is applied to the third diode D13/D23. Accordingly, the second diode D12/D22 does not conduct, and the third diode D13/D23 conducts, so that the level of the high voltage signal H_PS is raised by a voltage (+) charged in the third capacitor C13/C23 and output. That is, when a voltage drop across a diode is ignored, an output voltage is raised by the level of the high voltage pulse signal H_PS from the voltage level of the liquid crystal driving voltage AVDD1/AVDD2. At this point, a fourth capacitor C14 (C24) is charged with charges corresponding to a potential difference of voltages output from the third diode D13/D23. In this way, even during the following time period when the level of the high voltage pulse signal H_PS is smaller than that of the liquid crystal driving voltage AVDD1/AVDD2, a constant voltage can be output as a gate-on-voltage Von1/Von2 by the charges in the fourth capacitor C14/C24.

The first/second gate-on-voltage Von1/Von2 generated through the above process is provided to a fourth division resistor R14/R24 and a fifth division resistor R15/R25 and then divided. The divided voltages Von1_F and Von2_F are input to the second comparator A12/A22 of the second output deviation controller 232-1 and 232-2. Referring to FIG. 3, in the second output deviation controller 231-1 for controlling the output level of the first gate-on-voltage generator 213, the divided voltage Von2_F of the second gate-on-voltage is input to an inverting terminal (−) of the second comparator A12, and the divided voltage Von1_F of the first gate-on-voltage is input to a non-inverting terminal (+) of the second comparator A12. Therefore, the second comparator A12 outputs a second feedback signal Vfb21 corresponding to a difference (Von2_F−Von1_F) between the two divided voltages with respect to the divided voltages of the second gate-on-voltage Von2_F. Also, referring to FIG. 4, in the second output deviation controller 232-2 for controlling the output level of the second gate-on-voltage generator 223, the divided voltage Von1_F of the first gate-on-voltage is input to an inverting terminal (−) of the second comparator A22, and the divided voltage Von2_F of the second gate-on-voltage is input to a non-inverting terminal (+) of the second comparator A22. Therefore, the second comparator A22 outputs a second feedback signal Vfb21 corresponding to a difference (Von1_F−Von2_F) between the two divided voltages with respect to the divided voltage Von1_F of the first gate-on-voltage. These second feedback signals Vfb21 and Vfb22 are provided to the PWM modules 211 and 221, respectively, and the size of the second pulse is adjusted accordingly inside the PWM modules 211 and 221. Therefore, the voltage levels of the first and second gate-on-voltages Von1 and Von2 converge to an intermediate level to reduce output deviation between the first and second gate-on-voltages Von1 and Von2. Therefore, gate-on-voltages Von1 and Von2 have substantially the same voltage level.

The second charge pump circuit 214/224 includes a reference terminal, input terminal and an output terminal. A reference voltage is applied to the reference terminal. A second pulse signal is applied to the input terminal. The second pulse signal of which level is dropped by charge pump is output through the output terminal. Here, a ground power source can be used as the reference voltage, and a second pulse signal output from the second pulse output terminal PS2 of the PWM module 211/221 is used as the second pulse signal. As described above, the second pulse signal may be generated using the high voltage pulse H_PS generated by the inductor L11/L12 according to switching of the PWM module 211/221. Since the voltage of an output terminal should be smaller than that of a reference terminal in the second charge pump circuit 214/224, the second charge pump circuit 214/224 may include at least one diode having a cathode connected towards a reference terminal and an anode connected towards an output terminal. For example, the second charge pumping circuit 214/224 may include a fourth diode D14/D24 and a fifth diode D15/D25 connected in series, and a fifth capacitor C15/C25 connected to a node between the fourth diode D14/D24 and the fifth diode D15/D25. Here, the fourth diode D14/D24 and the fifth diode D I5/D25 may be zener diodes.

During a time period when the voltage level of a second pulse signal, i.e., the high voltage pulse signal H_PS is smaller than the voltage level of the ground voltage, a reverse voltage is applied to the fifth diode D15/D25 and a forward voltage is applied to the fourth diode D14/D24. Accordingly, the fifth diode D15/D25 does not conduct, and the fourth diode D14/D24 conducts, so that the fifth capacitor C15/C25 is charged with negative (−) charges corresponding to a potential difference between the ground power source and the high voltage pulse signal H_PS. Subsequently, during a time period when the voltage level of the high voltage pulse signal H_PS is greater than the voltage level of the ground voltage, a reverse voltage is applied to the fourth diode D14/D24 and a forward voltage is applied to the fifth diode D15/D25. The fourth diode D14/D24 does not conduct, and the fifth diode D15/D25 conducts, so that the voltage level of the high voltage signal H_PS is raised by a voltage (−) charged to the fifth capacitor C15/C25 and output. That is, when a voltage drop across a diode is ignored, an output voltage is dropped by the voltage level of the ground voltage from the voltage level of the high voltage pulse signal H_PS. In addition, a sixth capacitor C16/C26 is charged with charges corresponding to a potential difference of a voltage output from the fifth diode D15/D25. In this way, even during a following time period when the voltage level of the high voltage pulse signal H_PS is smaller than the voltage level of the liquid crystal driving voltage AVDD1/AVDD2, a constant voltage can be output as a gate-off-voltage Voff1/Voff2) by the charges in the sixth capacitor C16/C26. The gate-off-voltage Voff1/Voff2 is provided to a seventh division resistor R17/R27 and eighth division resistor R18/R28 and divided, and then input to a third feedback terminal FB3 of the PWM module 211/221. The duty ratio of the second pulse signal is adjusted inside the PWM module 211/221 according to the voltage level of a signal input to the third feedback terminal FB3, so that the voltage level of the gate-off-voltage Voff1/Voff2 is controlled to be constant.

The output deviation controller according to the exemplary embodiment of the present invention provides a feedback signal for controlling an output voltage to both sides of the first and second driving voltage generators to allow output voltages of the first and second driving voltage generators to converge to an intermediate level, so that output deviation between these output voltages reduces. Therefore, driving voltages output from the first driving voltage generator and driving voltages output from the second driving voltage generator have substantially the same voltage level. However, the present disclosure is not limited to the above exemplary embodiments. The feedback signal may be provided to only one of the first and second driving voltage generators. For example, the feedback signal may be provided only to the first driving voltage generator to control the output voltages of the first and second driving voltage generators to be substantially the same, so that output deviation can be reduced.

As described above in the exemplary embodiment, voltage levels of driving voltages output from a plurality of power source units are compared to generate feedback signals corresponding to potential differences of these voltage levels. The feedback signals are provided to the plurality of power source units, so that the voltage levels of the driving powers output from the plurality of power source units are controlled to converge to an intermediate level. Therefore, output deviation between the driving powers output from the plurality of power source units can be reduced.

Also, in the exemplary embodiment, driving powers having small output deviation and thus having substantially the same voltage level are respectively provided to a plurality of drivers for driving an LCD panel, so that display defects such as brightness abnormality and gray scale abnormality can be reduced, the display defects being caused by voltage level deviation of driving powers respectively provided to the plurality of drivers.

Although the invention has been described with reference to the accompanying drawings and the preferred embodiments, the present disclosure of invention is not limited thereto, but includes the appended claims. Therefore, it should be noted that various changes and modifications can be made by those skilled in the art in light of the foregoing without departing from the technical spirit of the present teachings.

What is claimed is:

1. A power generating module for Liquid Crystal Display (LCD) having a plurality of pixel units where each pixel unit includes a switching element connected to receive and selectively pass through a corresponding liquid crystal driving voltage, the switching element being further connected to receive and respond to each of a predetermined and nominal gate-on voltage that can turn the switching element on and a predetermined and nominal gate-off voltage that can turn the switching element off, the power generating module comprising:

a first driving voltage generator configured to generate and output a first set of LCD driving voltages including a first liquid crystal driving voltage and a first gate-on voltage;

a second driving voltage generator configured to generate and output a second set of LCD driving voltages including a second liquid crystal driving voltage and a second gate-on voltage, where the first and second liquid crystal driving voltages are counterpart components with respect to one another and where the first and second gate-on voltages are counterpart components with respect to one another; and an output deviation controller coupled between the first driving voltage generator and the second driving voltage generator, the output deviation controller being configured to control the first and second driving voltage generators using one or more feedback signals each having a magnitude which is a function of a potential difference between respective counterpart components of the first and second sets of LCD driving voltages.

2. The power generating module of claim 1, wherein the output deviation controller comprises:

a first output deviation controller configured to control an output deviation between the first and second liquid crystal driving voltages; and a second output deviation controller configured to control an output deviation between the first and second gate-on voltages.

3. The power generating module of claim 2, wherein the first output deviation controller comprises a first comparator configured to generate a first feedback signal which is a function of a potential difference between a first voltage which is a fraction of the first liquid crystal driving voltage and a second voltage which is a fraction of the second liquid crystal driving voltage.

4. The power generating module of claim 3, wherein the first comparator provides the first feedback signal to the first driving voltage generator.

5. The power generating module of claim 3, wherein the first output deviation controller further comprises a resistor configured to control an output level of the first comparator.

6. The power generating module of claim 3 wherein the second output deviation controller comprises a second comparator configured to generate a second feedback signal which is a function of a potential difference between a third voltage which is a fraction of the first gate-on voltage and a fourth voltage which is a fraction of the second gate-on voltage.

7. The power generating module of claim 6, wherein the second comparator provides the second feedback signal to the first driving voltage generator.

8. The power generating module of claim 6, wherein the second output deviation controller further comprises a second resistor configured to control an output level of the second comparator.

9. The power generating module of claim 1, further comprising:

respective first and second DC to DC converters respectively configured to generate the first liquid crystal driving voltage and the second liquid crystal driving voltage; and respective first and second charge pump circuits respectively configured to generate the first gate-on voltage and the second gate-on voltage.

10. The power generating module of claim 9, wherein each of the first and second charge pump circuits respectively comprises:

a reference terminal to which a reference voltage is applied;

an input terminal to which a pulse signal is input; and an output terminal through which a voltage level of the reference voltage raised by charge pumping is output.

11. A liquid crystal display (LCD), comprising:

an LCD panel including a plurality of gate lines and a plurality of data lines, the gate lines and the data lines intersecting each other;

a plurality of pixel units where each pixel unit includes a switching element connected to receive and selectively pass through a corresponding liquid crystal driving voltage from a corresponding data line, the switching element being further connected to receive from a corresponding gate line and respond to each of a predetermined and nominal gate-on voltage that can turn the switching element on and a predetermined and nominal gate-off voltage that can turn the switching element off;

a first gate driver and a second gate driver, spaced apart from one another and configured to drive the plurality of gate lines;

a first data driver and a second data driver, spaced apart from one another and configured to drive the plurality of data lines;

a first driving voltage generator configured to provide a respective first driving voltage to a respective at least one of the first gate driver and the first data driver;

a second driving voltage generator configured to provide a respective second driving voltage, that is a counterpart of the respective first driving voltage, to a respective at least one of the second gate driver and the second data driver; and an output deviation controller coupled between the first driving voltage generator and the second driving voltage generator, the output deviation controller being configured to control the first and second driving voltage generators using one or more feedback signals each having a magnitude which is a function of a potential difference between respective counterpart ones of the first and second driving voltages.

12. The LCD of claim 11, wherein the first and second gate drivers are connected to opposite ends of the plurality of gate lines.

13. The LCD of claim 11, wherein the first data driver is coupled to a first group of data lines and the second data driver is coupled to a second, different group of data lines.

14. The LCD of claim 11, wherein:

the first driving voltage generator is configured to provide as respective first driving voltages respectively to the first data driver and to the first gate driver, a first liquid crystal driving voltage and a first gate-on-voltage, and the second driving voltage generator is configured to provide as respective second driving voltages respectively to the second data driver and to the second gate driver, a second liquid crystal driving voltage and a second gate-on-voltage; and the output deviation controller comprises:

a first output deviation controller configured to control an output deviation between the first and second liquid crystal driving voltages; and a second output deviation controller configured to control output deviation between the first and second gate-on-voltages.

15. The LCD of claim 14, wherein the first output deviation controller comprises a comparator configured to generate a feedback signal which is a function of a potential difference between a first voltage which is a fraction of the first liquid crystal driving voltage and a second voltage which is a fraction of the second liquid crystal driving voltage.

16. The LCD of claim 14, wherein the second output deviation controller comprises a comparator configured to generate a feedback signal which is a function of a potential difference between a first voltage which is a fraction of the first gate-on-voltage and a second voltage which is a fraction of the second gate-on-voltage.

* * * * *